US010671594B2

(12) United States Patent
Hu et al.

(10) Patent No.: US 10,671,594 B2
(45) Date of Patent: *Jun. 2, 2020

(54) STATEMENT BASED MIGRATION FOR ADAPTIVELY BUILDING AND UPDATING A COLUMN STORE DATABASE FROM A ROW STORE DATABASE BASED ON QUERY DEMANDS USING DISPARATE DATABASE SYSTEMS

(71) Applicant: Futurewei Technologies, Inc., Plano, TX (US)

(72) Inventors: Ron-Chung Hu, Palo Alto, CA (US); Mengmeng Chen, San Jose, CA (US); Aniket Adnaik, Sunnyvale, CA (US); Chi Yong Ku, San Ramon, CA (US)

(73) Assignee: Futurewei Technologies, Inc., Plano, TX (US)

( * ) Notice: Subject to any disclaimer, the term of this patent is extended or adjusted under 35 U.S.C. 154(b) by 722 days.

This patent is subject to a terminal disclaimer.

(21) Appl. No.: 14/489,192

(22) Filed: Sep. 17, 2014

(65) Prior Publication Data

US 2016/0078079 A1    Mar. 17, 2016

(51) Int. Cl.
*G06F 16/23* (2019.01)
*G06F 16/20* (2019.01)
(Continued)

(52) U.S. Cl.
CPC .......... *G06F 16/2365* (2019.01); *G06F 16/20* (2019.01); *G06F 16/2438* (2019.01); *G06F 16/10* (2019.01); *G06F 16/284* (2019.01)

(58) Field of Classification Search
CPC .......... G06F 17/30371; G06F 17/3041; G06F 17/30563; G06F 16/2365; G06F 16/20; G06F 16/2438; G06F 16/284; G06F 16/10
(Continued)

(56) References Cited

U.S. PATENT DOCUMENTS 6,430,732 B1 * 8/2002 Hwang ............... G06F 17/5072
716/121
6,651,077 B1 * 11/2003 East .................... G06F 11/1469
(Continued)

FOREIGN PATENT DOCUMENTS

CN     102629268 A    8/2012
CN     102663116 A    9/2012
(Continued)

OTHER PUBLICATIONS

Sun, Linchao et al. Research of row-column mixed storage DBMS Application Research of COmputers Feb. 28, 2013 (Feb. 28, 2013) No. 2 vol. 30 pp. 480-482,486.
(Continued)

*Primary Examiner* — Pierre M Vital
*Assistant Examiner* — Andalib F Lodhi
(74) *Attorney, Agent, or Firm* — Vierra Magen Marcus LLP

(57) ABSTRACT

A method for updating a column store database and includes establishing a row store database, wherein each row comprises a plurality of attributes. The method includes establishing a column store database including attribute vectors corresponding to at least one attribute in the row store, wherein each attribute vector includes data used to satisfy at least one of previously received analytic queries. The method includes collecting a SQL change statements beginning from a synchronization point indicating when the row store database and the column store database are synchronized, and continuing until an analytic query is received. The method includes sending the plurality of SQL change statements to the column store database upon receipt of the analytic query for updating the column store database for purposes of satisfying the query, wherein the analytic query
(Continued)

is directed to a queried range of primary key attributes in the plurality of attributes.

19 Claims, 8 Drawing Sheets

(51) Int. Cl.
  *G06F 16/242* (2019.01)
  *G06F 16/10* (2019.01)
  *G06F 16/28* (2019.01)
(58) Field of Classification Search
  USPC .......................................................... 707/803
  See application file for complete search history.

(56) References Cited

U.S. PATENT DOCUMENTS

| | | | |
|---|---|---|---|
| 7,519,628 B1* | 4/2009 | Leverett | G06F 16/10 |
| 8,682,844 B2 | 3/2014 | Auer et al. | |
| 9,223,843 B1* | 12/2015 | Madhavarapu | G06F 16/2365 |
| 2005/0154756 A1* | 7/2005 | Dettinger | G06F 17/3064 |
| 2012/0005161 A1* | 1/2012 | Qi | G06F 17/30578 |
| | | | 707/637 |
| 2013/0066952 A1* | 3/2013 | Colrain | G06F 11/1438 |
| | | | 709/203 |
| 2013/0132371 A1 | 5/2013 | Bharath et al. | |
| 2013/0166553 A1* | 6/2013 | Yoon | G06F 17/30312 |
| | | | 707/737 |
| 2013/0198168 A1 | 8/2013 | Huang et al. | |
| 2013/0282650 A1* | 10/2013 | Zhang | G06F 17/30592 |
| | | | 707/605 |
| 2014/0244628 A1 | 8/2014 | Yoon et al. | |
| 2014/0258217 A1 | 9/2014 | Kemmler | |
| 2014/0324773 A1 | 10/2014 | Ding | |
| 2014/0337393 A1* | 11/2014 | Burchall | G06F 9/466 |
| | | | 707/826 |
| 2015/0261805 A1 | 9/2015 | Lee et al. | |
| 2017/0097977 A1 | 4/2017 | Yoon et al. | |
| 2017/0132260 A1 | 5/2017 | Bi et al. | |

FOREIGN PATENT DOCUMENTS

| | | |
|---|---|---|
| CN | 103177046 A | 6/2013 |
| CN | 103177055 A | 6/2013 |
| CN | 103177058 A | 6/2013 |
| CN | 203177055 A | 6/2013 |
| CN | 103455531 A | 12/2013 |
| CN | 103631937 A | 3/2014 |
| CN | 103703467 B | 4/2014 |
| CN | 105095247 A | 11/2015 |
| WO | 2009037363 A1 | 3/2009 |

OTHER PUBLICATIONS

Li, Chao et al. Survey and Review on Key Technologies of Column Oriented Database Systems Computer Science Dec. 31, 210(Dec. 31, 2010) No. 12 vol. 37 pp. 1-7,17.
International Search Report dated Nov. 13, 2015, PCT/CN2015/089575.
Supplementary Extended European Search Report issued in corresponding EP Application No. 15842381.4 dated Jun. 16, 2017, 6 Pages.
Notice of Allowance in U.S. Appl. No. 14/488,775 dated Aug. 4, 2017, 17 Pages.
Office Action dated Apr. 29, 2019, in Chinese Patent Application No. 2015800500749, 3 pages.
Search Report dated Apr. 8, 2019, in Chinese Patent Application No. 2015800500749, 3 pages.
Office Action dated Jun. 5, 2019, in Chinese Patent Application No. 201580050100.8, 4 pages.

* cited by examiner

600

Procedure SBM
    Locate the last committed *LSN* in the migration queue;
    while there are committed transactions do
        Fetch next committed transaction with TxnId;
        for each SQL statement in TxnId do
            switch (statement type) {
            case 'insert': need to short-circuit a field if the
                corresponding attribute vector does not exist;
            case 'delete': replay delete statement;
            case 'update': need to short-circuit a field if the
                corresponding attribute vector does not exist;
            }
        end for
        Save the migrated TxnId and latest *LSN* for this transaction to
            column store's log file;
    end while
    Save the latest *LSN* into metadata;
- end procedure

FIG. 6

STATEMENT BASED MIGRATION FOR ADAPTIVELY BUILDING AND UPDATING A COLUMN STORE DATABASE FROM A ROW STORE DATABASE BASED ON QUERY DEMANDS USING DISPARATE DATABASE SYSTEMS

CROSS REFERENCE TO RELATED APPLICATIONS

This application is related to the commonly owned, patent application, U.S. Ser. No. 14,488,775, entitled "-METHOD AND SYSTEM FOR ADAPTIVELY BUILDING A COLUMN STORE DATABASE FROM A TEMPORAL ROW STORE DATABASE BASED ON QUERY DEMANDS," with filing date Sep. 17, 2014, which is herein incorporated by reference in its entirety. This application is also related to the commonly owned, patent application U.S. Ser. No. 14/489,050, entitled "-METHOD AND SYSTEM FOR ADAPTIVELY BUILDING AND UPDATING A COLUMN STORE DATABASE FROM A. ROW STORE DATABASE BASED ON QUERY DEMANDS," with filing date Sep. 17, 2014, which is herein incorporated by reference in its entirety.

BACKGROUND

Based on the storage format of data records, a relational database system can have either row store or column store to save data records. In a row store database, data records are arranged in row format. A row store usually delivers good performance for online transaction processing (OLTP) transactions which often contain INSERT/DELETE/UPDATE operations. For instance, information can be changed for an entire row that involves one disk I/O operation. On the other hand, in a column store database, data records are arranged in column format. A column store delivers good performance for online analytical processing (OLAP) queries, as it need only read those columns necessary to process a query which also significantly reduces disk I/O operations.

Since row store and column store are good for different types of queries, it has been proposed to contain both row store and column store, i.e. hybrid row/column store, in a database system to handle a mixed workload. The goal is to achieve good OLTP performance and output real time (or almost real time) analytic results on a single database system. The common way to build a column store database from a row store database is to extract data records from row store, transform them, and load the data into attribute vectors for respective columns. That is, the column store is built statically before any analytic queries are received or executed. For example, an ETL (Extract-Transform-Load) process is executed during off-peak periods where the database is unavailable for online access in order to transfer the data to the column store database.

However, the typical approach to build a column store database is problematic as it necessarily overbuilds the database to include data that is irrelevant for any subsequent query or queries. In particular, it is often difficult to foresee which queries will be run on the database, and to which data those queries are directed. As such, the column store most likely will be over-built in order to accommodate all potential queries (e.g., building an attribute vector or column for every attribute in the row store database).

In addition, with increasing demand for constant access to database records by customers and companies located around the world, there is probably no good time window long enough to perform an ETL process to transfer data from row store into column store. That is, there are no longer any off-peak periods and not enough time to build a column store database without severely affecting the accessibility of the database system.

Furthermore, traditional hybrid row/column store database systems cannot provide real-time analytics. That is, analytic queries cannot be executed in real time, since the queries must wait for ETL operations to be completed during their scheduled times before query execution.

As such, existing hybrid row/column store database systems still rely on a predictive approach for guessing which attributes will be accessed during execution of queries, and tend to overbuild its column store databases before any query is received or executed. In addition, to facilitate speed of access, these traditional column store databases are built in main memory, such as random access memory (RAM), but will suffer a huge performance penalty during a system crash when the entire column store database is erased. As a result, the system remains down during a system recovery process, wherein the entire column store database is rebuilt.

It would be advantageous to build a column store database from a row store database that is not overbuilt for the queries requiring access to data, and that provides real-time query analytic execution.

SUMMARY

In some embodiments of the present invention, an apparatus is disclosed. The apparatus includes memory having stored therein computer executable instructions, and a processor executing computer-executable instructions stored in the memory. The executable instructions include establishing a row store database, wherein each row of the row store database includes a plurality of attributes. The instructions include establishing a column store database including data structured to satisfy received analytic queries. The column store database includes a plurality of attribute vectors corresponding to at least one attribute in the row store database, wherein each of the attribute vectors includes data used to satisfy at least one of a plurality of previously received analytic queries. The instructions include collecting a plurality of SQL change statements beginning from a synchronization point and continuing until an analytic query is received. The synchronization point indicates when the row store database and the column store database are synchronized. The instructions include sending the plurality of SQL change statements to the column store database upon receipt of the analytic query for updating the column store database for purposes of satisfying the query, wherein the analytic query is directed to a queried range of primary key attributes in the plurality of attributes.

In other embodiments, a method for updating a column store database system using statement based migration is disclosed. The method includes establishing a row store database, wherein each row of the row store database includes a plurality of attributes. The method includes establishing a column store database including data structured to satisfy received analytic queries. The column store database includes a plurality of attribute vectors corresponding to at least one attribute in the row store database, wherein each of the attribute vectors includes data used to satisfy at least one of a plurality of previously received analytic queries. The method includes collecting a plurality of SQL change statements beginning from a synchronization point and continuing until an analytic query is received. The synchronization point indicates when the row store database and the column store database are synchronized. The method includes sending the plurality of SQL change statements to the column store database upon receipt of the analytic query for updating the column store database for purposes of satisfying the query, wherein the analytic query is directed to a queried range of primary key attributes in the plurality of attributes.

In still other embodiments of the present invention, a non-transitory computer-readable medium having computer-executable instructions for causing a computer system to perform a method for accessing information is disclosed. The method includes establishing a row store database, wherein each row of the row store database includes a plurality of attributes. The method includes establishing a column store database including data structured to satisfy received analytic queries. The column store database includes a plurality of attribute vectors corresponding to at least one attribute in the row store database, wherein each of the attribute vectors includes data used to satisfy at least one of a plurality of previously received analytic queries. The method includes collecting a plurality of SQL change statements beginning from a synchronization point and continuing until an analytic query is received. The synchronization point indicates when the row store database and the column store database are synchronized. The method includes sending the plurality of SQL change statements to the column store database upon receipt of the analytic query for updating the column store database for purposes of satisfying the query, wherein the analytic query is directed to a queried range of primary key attributes in the plurality of attributes These and other objects and advantages of the various embodiments of the present disclosure will be recognized by those of ordinary skill in the art after reading the following detailed description of the embodiments that are illustrated in the various drawing figures.

BRIEF DESCRIPTION

The accompanying drawings, which are incorporated in and form a part of this specification and in which like numerals depict like elements, illustrate embodiments of the present disclosure and, together with the description, serve to explain the principles of the disclosure.

FIG. 6 is a diagram of an exemplary algorithm implemented for executing SQL statements saved in a migration buffer when building a column store database using an adaptive, just-in-time, and just-enough statement based migration process to satisfy an executing query, in accordance with one embodiment of the present disclosure.

DETAILED DESCRIPTION

Figure 1:
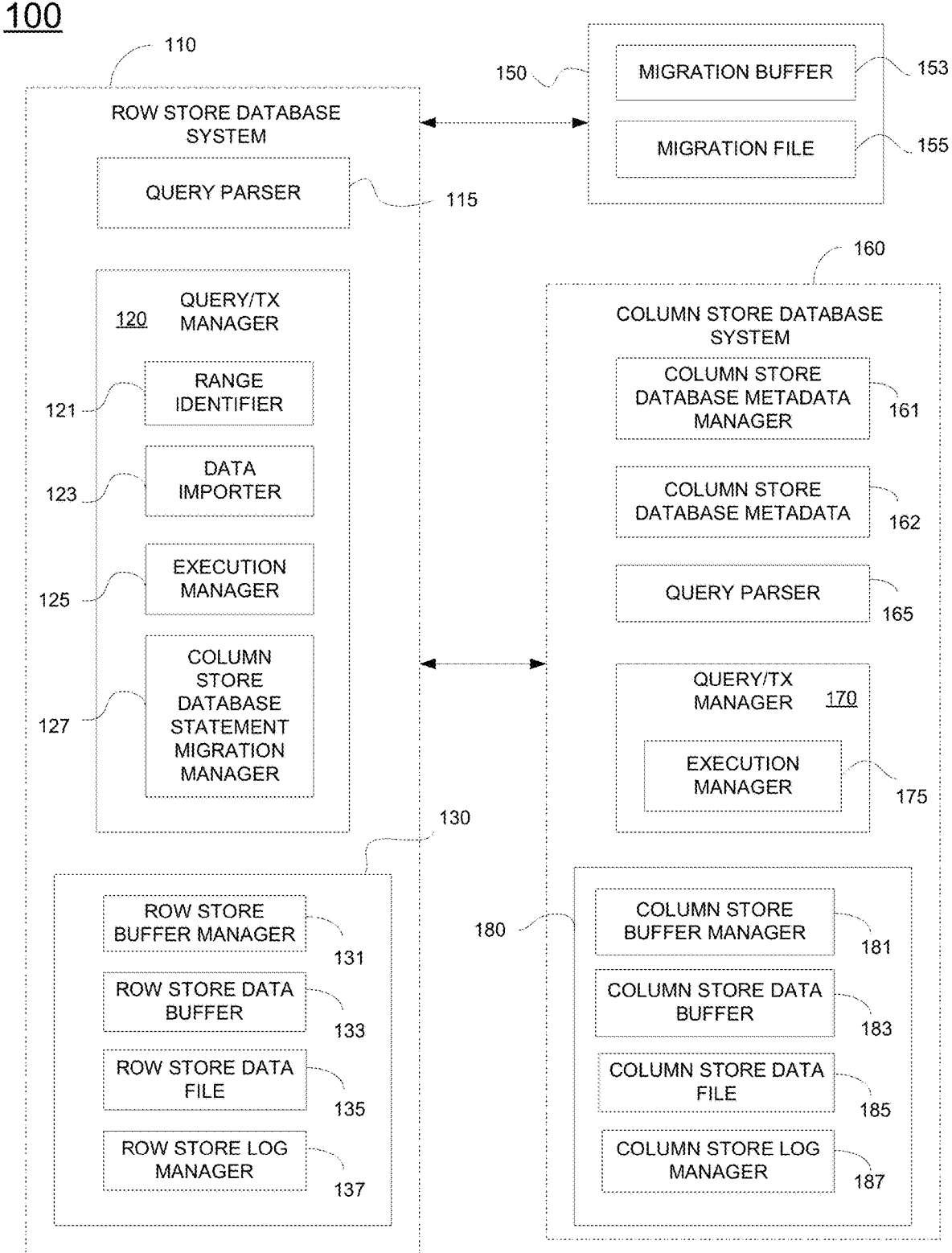
FIG. 1 is block diagram of a database system including a row store database and a column store database, wherein the column store database is built implementing a an adaptive, just-in-time, and just-enough statement based migration process, in accordance with one embodiment of the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Accordingly, embodiments of the present disclosure provide for adaptively building and/or updating a column store database from a row store database implementing statement based migration to satisfy an analytic query directed to referenced attribute vectors or columns. Other embodiments of the present disclosure provide for building a column store database from a row store database implementing statement based migration that is not over-built with data not useful for the analytic queries accessing the database. Still other embodiments of the present disclosure provide for real-time execution of queries using a column store database adaptively built at run time implementing statement based migration for each of a plurality of received queries. Other embodiments provide for just-in-time data consistency for queries running on a column store database by updating the column store database in response to queries. Still other embodiments provide for a database system that builds a column store database from a row store database implementing statement based migration by utilizing functionally disparate database systems, such as open source database systems, which drastically reduces development costs and time-to-market over single format database system designed from scratch. Additionally, other embodiments disclose a hybrid row/column store database in a single database management system, wherein a recovery system does not change the system recovery time over a row store database system because memory copies of statements to the migration buffer for a column store database are made without updating the attribute vectors of the column store database during the system recovery operation.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities, and refer to the action and processes of a computing system, or the like, including a processor configured to manipulate and transform data represented as physical (electronic) quantities within the computer system's registers and memories into other data similarly represented as physical quantities within the computer system memories or registers or other such information storage, transmission or display devices.

Flowcharts of examples of methods for providing video segmentation are described, according to embodiments of the present invention. Although specific steps are disclosed in the flowcharts, such steps are exemplary. That is, embodiments of the present invention are well-suited to performing various other steps or variations of the steps recited in the flowcharts. Also, embodiments described herein may be discussed in the general context of computer-executable instructions residing on some form of computer-readable storage medium, such as program modules, executed by one or more computers or other devices. By way of example, and not limitation, the software product may be stored in a nonvolatile or non-transitory computer-readable storage media that may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

FIG. 1 is block diagram of a database system 100 including a row store database system 110 that includes a row store database 130, and a column store database system 160 that includes a column store database 180, wherein the column store database 180 is built implementing an adaptive, just-in-time, and just-enough statement based migration process, in accordance with one embodiment of the present disclosure. Specifically, the column store database 180 is built dynamically and progressively at run time for each received analytic query, and wherein the column store database 180 is adaptively built to satisfy each query.

Database system 100 may include a processor and memory, wherein the processor is configured to execute computer-executable instructions stored in the memory, and wherein the processor is configured to build a column store database implementing an adaptive, just-in-time, and just-enough statement based migration process, in accordance with one embodiment of the present disclosure. In one embodiment, the processor is configured to execute processes outlined in FIGS. 3, 4, 5A-5B, and 6. For instance, the processor may be configured to perform the functions of one or more of the example embodiments described and/or illustrated herein, such as the operations performed by query/transaction managers 120 and/or 170. The processor may be included within a single or multi-processor computing device or system capable of executing computer-readable instructions. In its most basic form, a computing device may include at least one processor and a system memory. System memory is coupled to processor, and generally represents any type or form of volatile or non-volatile storage device or medium capable of storing data and/or other computer-readable instructions. Examples of system memory include, without limitation, RAM, ROM, flash memory, or any other suitable memory device.

In one embodiment, the row store database system 110 and the column store database system 160 are disparate systems. As such, the hybrid database system is built from two functionally disparate database systems, namely one row store database system and one column store database system. For example, many open-source, otherwise referred to as free-and-open source software (FOSS) database systems are available and have proven reliable. For purposes of illustration only, current popular FOSS database systems include MySQL, PostgreSQL, MonetDB, SQLite, etc. Among them, MySQL, PostgreSQL, and SQLite are row store database systems, and MonetDB manages a column store database system. In embodiments of the present invention, a hybrid database system including row store and column store is built on utilizing FOSS database systems, such as, building and managing a row store database system using MySQL (or PostgreSQL), and separately building and managing a column store database system using MonetDB. By taking advantage of these two functionally disparate database systems, a significant reduction in development cost and time is achieved, while still providing good OLTP performance and while enjoying real time analytics.

For purposes of discussion, a "memory database system" or "main memory database system" refers to a database system including a CPU and "main memory", wherein the main memory is configured to hold all of the data in order to function properly. For example, a main memory may be comprised of random access memory (RAM). The main memory may be backed up with persistent storage, or with a battery back-up system. For purposes of illustration, a 100 GB main memory database system is configured to store all 100 GB in main memory.

Embodiments of the present invention disclose a database system that allows data to be distributed in main memory and persistent storage, taken alone or in combination. For instance, in one embodiment, the majority of the data, if not all, is stored in persistent storage. That is, using the example of the 100 GB storage system, the data is stored in persistent storage, and main memory (e.g., 4 GB) is used for quicker access, such as, through a buffer. In that manner, a laptop is now a suitable medium for storing large amounts of data, whereas traditionally a laptop was unsuitable to be configured with 100 GBs of main memory. In still another embodiment, the data is stored in main memory for normal operation, and with a back-up to persistent storage.

Since row store and column store databases are good for different types of queries, embodiments of the present invention utilize a database system that includes both a row store database and column store database. Specifically, embodiments of the present invention provide for a hybrid row/column store access in a database system 100 to handle a mixed OLTP/OLAP workload. Considering the low cost and high capacity of computing systems, it is feasible to have both row store and column store in a database system. As a result, the hybrid row store and column store database system 100 achieves high OLTP performance, while enjoying real time (or almost real time) analytics result in a mixed workload environment.

As shown in FIG. 1, the database 100 includes a row store database1 30, as managed by the row store database system 110. Each row of the row store database 130 includes a plurality of attributes. In one embodiment, the row store database 130 is the source of truth, such that data in the row store database 130 stores the true values. In one embodiment, the row store database 130 maintains data consistency all the time, such that the row store database is up-to-date.

For example, row store database 130 may be defined as an employee table that includes eight attributes, wherein a table is a collection of records. For illustration, the employee table may include information related to the employees of a company, wherein the information is defined as attributes. A table definition is provided below that defines the attributes of an exemplary employee table, as follows:

```
CREATE TABLE Employee
(
        EmpNo int not null primary key,
        Name varchar(127) not null,
        Gender char(1) not null,
        DeptNo int not null,
        StartDate date,
        Title varchar(50) not null,
        Salary Decimal(10,2) null,
        Comment varchar(255) null,
    PRIMARY KEY (EmpNo),
    INDEX (Name),
    INDEX (DeptNo)
);
```

Figure 2A:
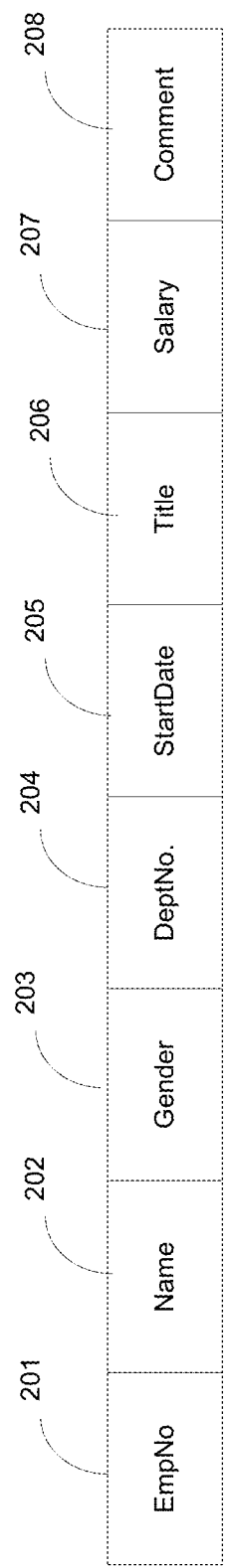
FIG. 2A is an exemplary illustration of a row entry 200 of the employee table defined above, in accordance with one embodiment of the present disclosure.

FIG. 2A is an exemplary illustration of a row entry 200A of the employee table defined above, in accordance with one embodiment of the present disclosure. For example, the employee table includes an attribute 201 for employee number, attribute 202 for employee name, attribute 203 for gender, attribute 204 for department number, attribute 205 for start date, attribute 206 for title, attribute 207 for salary, and a attribute 208 for comments.

The row store database 130 includes a row store data buffer 133 configured to store data in non-persistent main memory, such as RAM, and is managed by a row store buffer manager 131. In addition, the row store database 130 includes a row store data file 135, which persistently stores data, such as storing to disk. A row store log manager 137 tracks and/or manages the updates and changes to the row store database 130, and may be included within database 130, or operated as a separate entity.

In addition, the database system 100 includes a column store database 180 that includes data structured to satisfy received analytic queries, and is managed by the column store database system 160. That is, attribute vectors in the column store database 180 is built with data used to satisfy at least one of a plurality of previously received analytic queries. More particularly, the column store database 180 includes a column store data buffer 183 configured to store data in non-persistent main memory, such as RAM, and is managed by a column store buffer manager 181. In addition, the column store database 180 includes a column store data file 185, which persistently stores data, such as storing to disk. A column store log manager 187 tracks and/or manages the updates and changes to the column store database 180, and may be included within database 180, or operated as a separate entity.

In the column store database 180, there exists one attribute vector for each column or attribute that is referenced by any of a plurality of queries accessing the database system 100. For example, the attribute vector includes one pair of information (e.g., RowID, value) for each scanned record of a table. For example, each entry of the attribute vector corresponds to a scanned record of the row table stored in row store database 130, and includes the pair of information, wherein the RowID, corresponds to a related row entry, and the value is an abbreviated/encoded internal representation of the data of a specific attribute (or column) for a given row. In particular, the RowID uniquely identifies the related row entry that corresponds to the information in the column store database 180. In one embodiment, a primary key is used to reference row entries in the row store database 130, wherein the primary key is mappable to a corresponding RowID.

Figure 2B:
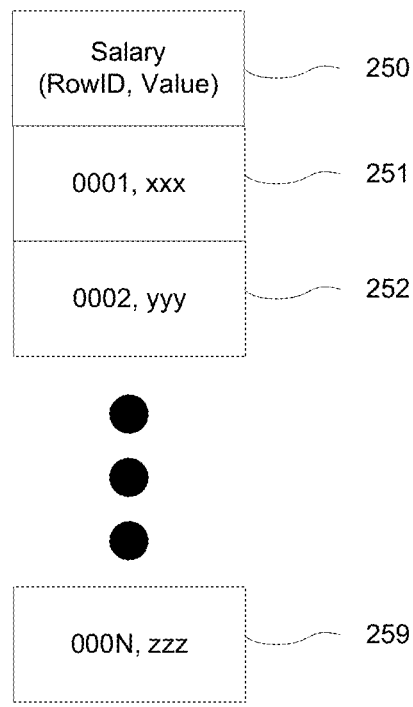
FIG. 2B is an illustration of an exemplary attribute vector used in a column store for the salary attribute of the employee table shown in FIG. 2A, in accordance with one embodiment of the present disclosure.

FIG. 2B is an illustration of an exemplary attribute vector 200B for the salary attribute of the employee table 200A, in accordance with one embodiment of the present disclosure. As shown in information block 250 for the attribute vector 200B containing salaries, each entry in the column includes a RowID that identifies the related row entry in the column store database 180 (and possibly the related row store database 130), and a value representing the salary of the corresponding employee. For example, in field 251, the row entry is "0001" with a salary of "xxx"; in field 252 the row entry is "0002" with a salary of "yyy"; and for field 259, the row entry is "000N" with a salary of "zzz".

The covered range of an attribute vector in the column store database 180 refers to the range of the primary key values, in accordance with one embodiment of the present disclosure. That is, a suitable range of primary key values can be used to define a covered range for any attribute vector. Like RowID, the primary key value can also uniquely identify a record. There exists a one-to-one mapping between RowID and primary key, such that a primary key can be used to reference row entries in the row store database, and is also mappable to a corresponding RowID. For example, in the Employee Table provided above, the primary key is the Employee Number (EmpNo), which can be used to uniquely identify a row entry (e.g., through mapping) of a row store database. Each row entry uniquely corresponds to a different employee.

A more detailed discussion on the handling of change statements for updating the row store database 130, and the migration of selected change statements to the column store database 180 for adaptive updating to satisfy a corresponding analytic query is presented below. In particular, a two-stage operation is implemented to migrate changes at the SQL statement level. In the first stage, change statements meeting three conditions are saved to a migration queue and later replayed in the column store database system 160. The conditions include saving SQL change statements 1) that impact attribute vectors already built in the column store database 180; 2) that impact any record in the covered intervals of the attribute vectors; and 3) that are committed to the row store database 130. The first stage occurs during commitment of the change statements. The second stage is performed when an analytic query is executed, and replays the SQL change statement saved in the migration queue.

In particular, the row store database system 110 includes a query parser 115 that is configured to receive and accept analytical queries delivered to the database system 100. For example, the query parser 115 is able to transform the query (e.g., a SQL query) presented as a logical data manipulation/ representation into a canonical form of algebraic operators that are executable by the row store database 130.

In one embodiment, the query parser 115 is also configurable to determine when a change statement or transaction (e.g., insert, delete, update) is received by the database system 100. In that case, the change statement (e.g., SQL statement) is handed over to the query/transaction manager 120 for purposes of updating the row store database 130. In another embodiment, the query/transaction manager 120 directly receives the change statements instead of being delivered by the query parser 115. As such, the query/transaction manager 120 is configured to manage the execution of change transactions and the storing of data within the row store database 130 during the execution of the change transaction. In particular, the query/transaction manager 120 includes an execution manager 125 that is configured for executing the plurality of change transactions on the row store database 130.

In addition, the query/transaction manager 120 is configured for adaptively building a column store database 180 when executing an analytic query through statement based migration. That is, a selection of change statements directed to the row store database 130, either directly or through the query parser 115 are collected and migrated to the column store database 180 for updating the column store to satisfy a corresponding analytic query.

Specifically, the row store query/transaction manager 120 is configured for managing the collection of a plurality of change statements (e.g., SQL statements) beginning from a synchronization point indicating when the row store database 120 and the column store database 180 are synchronized. The current collection cycle is continued until an analytic query is received and a new synchronization point is established. Each of the change statements is ordered, such as, associating a change statement with a corresponding log sequence number (LSN), and can be used for synchronization. In one embodiment, a migration management module 150 is configured for storing a migration queue storing the plurality of SQL change statements. For instance, the migration management module 150 includes a migration buffer 153 for storing change statements in the migration queue in non-persistent main memory, such as RAM, and a migration file 155 for persistently storing change statements, such as storing to disk. In one embodiment, the migration queue is cleared after the plurality of SQL statements are applied to the column store database 180.

Furthermore, a column store database statement migration manager 127 in the query/transaction manager 120 is configured for sending the plurality of SQL change statements to the column store database upon receipt of the analytic query in order to update the column store database for purposes of satisfying the query. The analytic query is directed to a queried range of primary key attributes in the plurality of attributes. In one embodiment, the column store statement migration manager 127 also performs the collection of change statements, previously described. As such, the column store database 180 is built dynamically and adaptively to execute analytic queries. That is, the column store database 180 achieves data consistency (to match the state of the row store database 130) at the last minute when handling a corresponding analytic query.

In particular, a normally utilized scan operation (either full table scan or partial table scan) on the row store database is implemented to build/enhance the attribute vector for each referenced column in the column store when a query is executed on the row store database. Further, when a referenced attribute vector and its covered intervals are used by a query, recently committed changes need to be included within the column in order to show real time data content. Specifically, when changes are committed to the row store database, the contents of the column store database are not updated immediately to reflect the changes, such that the column store data is not synchronized with row store data in real time. Instead, embodiments of the present invention dynamically and adaptively update the column store database by refreshing column store data based on run-time analytic queries as implemented using statement based migration.

In one embodiment, when an analytic query needs to use a table scan operation, the attribute vector of the primary key column is built, even though the primary key is not referenced in a given query. This attribute vector provides mapping between the primary key values and corresponding RowID values. For a query involving full table scan operation, the covered range is only one single interval with all the possible values. For a query involving a partial table scan operation over a range of primary key values, then corresponding attribute vectors for the referenced attributes are built with a subset of records covering the range.

For purposes of satisfying a corresponding analytic query, the column store database system 160 is configured to receive the plurality of change statements (e.g., SQL statements) to adaptively update the column store database 180 in order to satisfy a corresponding analytic query. Because the column store database system 160 is its own functional system, it is able to independently operate on the change statements and/or analytic queries. For instance, the column store database system 160 includes a query parser 165 that is configured to receive and accept analytical queries delivered to the database system 100. The query parser 165 is able to transform the query (e.g., a SQL query) presented as a logical data manipulation/representation into a canonical form of algebraic operators that are executable by the column store database 180. In one embodiment, the column store query parser 165 is configured for determining a referenced attribute and attribute vector referenced by the analytic query, and for returning a result back to the query/transaction manager 170.

In one embodiment, the query parser 165 is also configurable to determine when a change statement is received. In that case, the change statement (e.g., SQL statement) is handed over to the query/transaction manager 170 for purposes of updating the column store database 180. In another embodiment, the query/transaction manager 170 directly receives the change statements. As such, the query/transaction manager 170 is configured to manage the execution of change transactions and the storing of data within the column store database 180 during the execution of the change transaction. In particular, the query/transaction manager 170 includes an execution manager 175 that is configured for executing the plurality of change transactions on the column store database 180.

After the column store database 180 is updated, the query/transaction manager 120 is in a position to execute the query using data from the column store database 180. Specifically, the query/transaction manager 170 is configured to determine the most efficient path for executing a subsequently received analytic query that is received in a synchronization cycle, including which data is referenced by the query. For instance, the identified analytic query is directed to a queried range of primary key attributes for a first referenced attribute (e.g., salary) in the plurality of attributes. As an example, an analytic query asking for the average salary of male employees with Employee Number greater than 8000 may access two attribute vectors (e.g., gender and salary) over a queried range of the primary key attribute (Employee Number) greater than 8000.

A range identifier 121 in the query/transaction manager 120 is configured for determining if a covered range of primary key attributes associated with a corresponding attribute vector (e.g., first referenced attribute) of the column store database 180 is within or encompasses the queried range of primary key attributes. In particular, the range identifier 121 communicates with the column store database metadata manager 161 to access metadata including state information for the metadata. That is, the metadata includes state information related to what attribute vectors have been built in the column store database 180. More particularly, the metadata includes a covered range (e.g., primary key attributes) corresponding to each attribute vector in the column store database 180. In that manner, a determination can be made by the query/transaction manager 120 whether or not the covered range encompasses the queried range to satisfy the query.

When the covered range of primary key attributes, as stored in the column store database 180 for an attribute vector of a first referenced attribute, encompasses the queried range, then the data contained within the column store database 180 is sufficient to satisfy the query.

On the other hand, when the covered range of primary key attributes as stored in the column store database 180 for an existing attribute vector of a first referenced attribute does not encompass the queried range, then the covered range is enhanced in order to satisfy the query. For example, the attribute vector is enhanced by fetching the column data directly from the table records in the row store database 130. Additionally, when the covered range of primary key attributes for a referenced attribute is a null set, then the entire attribute vector for the referenced attribute is built from the row store database. That is, values over the queried range of primary key attributes are used to build the attribute vector for the referenced attribute.

In one embodiment, the enhancement of an attribute vector includes importing a targeted amount of data that comprises a minimum amount of data, or just-enough data to support and satisfy the currently executing analytic query. Using the example query asking for the average salary of males with Employee Number (EmpNo) greater than 8000, an attribute vector including salary information may include information with Employee Number greater than 9000. In that case, the covered range (the Employee Number greater than 9000) does not encompass the queried range (Employee Number greater than 8000) of the attribute vector for salary. As such, the attribute vector for salary is enhanced with the targeted data so that the covered range of primary key attributes will encompass the queried range of primary key attributes for that referenced attribute. The targeted data that is imported to the column store database includes salary information for Employee Number from 8000 to 9000. More specifically, a data importer 127 of the query manager/optimizer 120 is configured for importing the targeted data from the row store database 130, in the corresponding temporal state, to enhance the covered range for the attribute vector in order to encompass the queried range.

Figure 3:
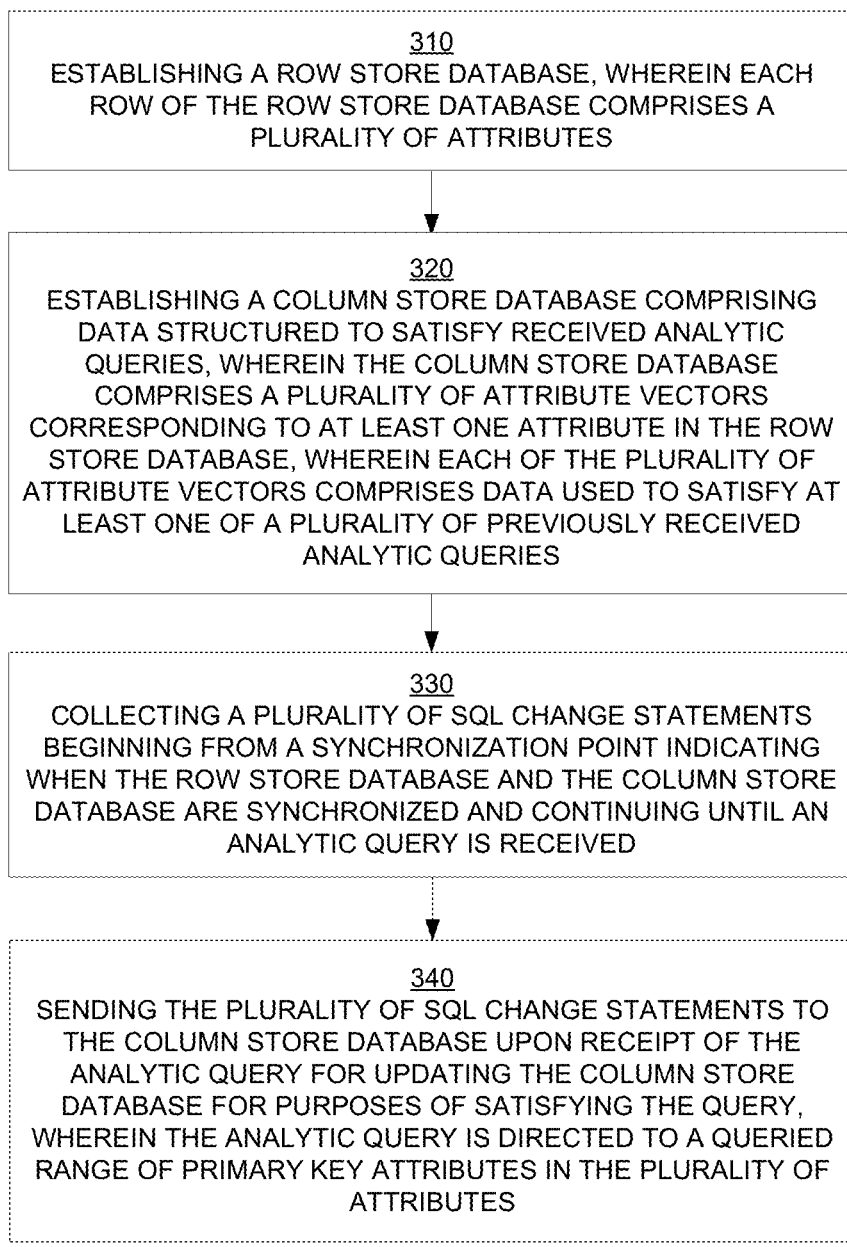
FIG. 3 is a flow diagram illustrating a method for accessing data from a column store database built from a row store database using an adaptive, just-in-time, and just-enough statement based migration process, in accordance with one embodiment of the present disclosure.

FIG. 3 is a flow diagram illustrating a method for accessing data from a column store database built from a row store database using an adaptive, just-in-time, and just-enough statement based migration process, in accordance with one embodiment of the present disclosure. In one embodiment, flow diagram 300 illustrates a computer implemented method for accessing data from a column store database built from a row store database using an adaptive, just-in-time, and just-enough statement based migration process. In another embodiment, flow diagram 300 is implemented within a computer system including a processor and memory coupled to the processor and having stored therein instructions that, if executed by the computer system causes the system to execute a method for accessing data from a column store database built from a row store database using an adaptive, just-in-time, and just-enough statement based migration process. In still another embodiment, instructions for performing the method are stored on a non-transitory computer-readable storage medium having computer-executable instructions for causing a computer system to perform a method for accessing data from a column store database built from a row store database using an adaptive, just-in-time, and just-enough statement based migration process. The operations of flow diagram 300 are implemented within the database system 100, including query/transaction manager 120, and system 700 of FIGS. 1 and 7, respectively, in some embodiments of the present disclosure.

At 310, the method includes establishing a row store database for storing data, wherein each row of the row store database comprises a plurality of attributes. In one embodiment, the row store database is the source of truth. That is, the row store database is the source for data from which other databases may be built, such as, the column store database.

At 320, the method includes establishing a column store database comprising data structured to satisfy received analytic queries. The column store database contains a collection of attribute vectors for a table, wherein the attribute vectors correspond to at least one attribute in the row store database. At a specific point in time, each of the attribute vectors include data that is used to satisfy at least one of a plurality of previously received analytic queries. More particularly, there exists one attribute vector for each column or attribute that is referenced by any of a plurality of queries accessing the database system. As previously described, the attribute vector includes a pair of information (e.g., RowID, value; or primary key, value) for each scanned record of a table (e.g., row store database).

A two stage process is implemented for adaptively building the column store database during execution of a corresponding analytic query based on change statement migration as outlined, in part, at 330 and 340 of the flow diagram 300. When changes are committed to a row store database, the column store database is not updated immediately, such that the column store data is not synchronized with the row store data in real time. Instead, since the row store database is the source of truth, collected SQL change statements are replayed on the columnar system in order to migrate the changes to column store database. As such, the column store database achieves data consistency with the row store database at the last minute during query processing.

At 330, the method includes collecting a plurality of SQL change statements beginning from a synchronization point indicating when the row store database and the column store database are synchronized and continuing until an analytic query is received. The plurality of change statements is a subset of the totality of change statements directed to the row store database system. The plurality of SQL change statements that are collected are stored in a migration queue after each is committed during the process of updating the row store database.

Specifically, as implemented by 330 of flow diagram 300, the first stage for adaptively building the column store database includes defining the proper subset of change statements (e.g., SQL statements) or plurality of change statements that meet three conditions, as previously described, and listed as follows: (1) those SQL change statements that impact the attribute vectors already built, (2) those SQL change statements that impact any record in the covered intervals; and (3) those committed SQL change statements. The qualified SQL change statements are saved into a migration queue, and are later replayed in the column store database system. The first stage occurs during the commit time of corresponding change statements (e.g., insert/delete/update).

At 340, the method includes sending the plurality of change statements to the column store database upon receipt of the analytic query for updating the column store database for purposes of satisfying the query. The analytic query is directed to a queried range of primary key attributes associated with the plurality of attributes.

More specifically, as implemented by 340 of flow diagram 300, the second stage for adaptively building the column store database includes replaying the plurality of SQL change statements collected into the migration queue when executing an analytic query received at the end of a synchronization cycle. In this way, the contents of the column store database are brought up to date before the analytic query actually runs. After the column store database is updated, the analytic query is executed to obtain a result.

After updating the column store database, the synchronization point is updated to reflect the last committed change statement in the plurality of change statements. The plurality of change statements is collected beginning from the last synchronization point, which indicates to which point the column store database includes data that is consistent with the row store database. After the column store database is newly updated using the collected SQL change statements, the synchronization point is also updated to reflect the last committed change statement in the plurality of change statements, or synchronization cycle. In addition, in one embodiment, the migration queue holding the plurality of change statements is cleared after the change statements are applied to the column store database.

Specifically, a scan operation (either full table scan or partial table scan) on the row store database is performed to build/enhance the attribute vector for each referenced column in the column store when a query is executed on a row store. In general, the first set of analytic queries will be slower, as the attribute vectors over their required ranges are progressively built. However, later analytic queries will be executed quickly using existing attribute vectors in the column store and with minimal updating of data.

Two Stage Migration of Changes to Column Store Database

Figure 4:
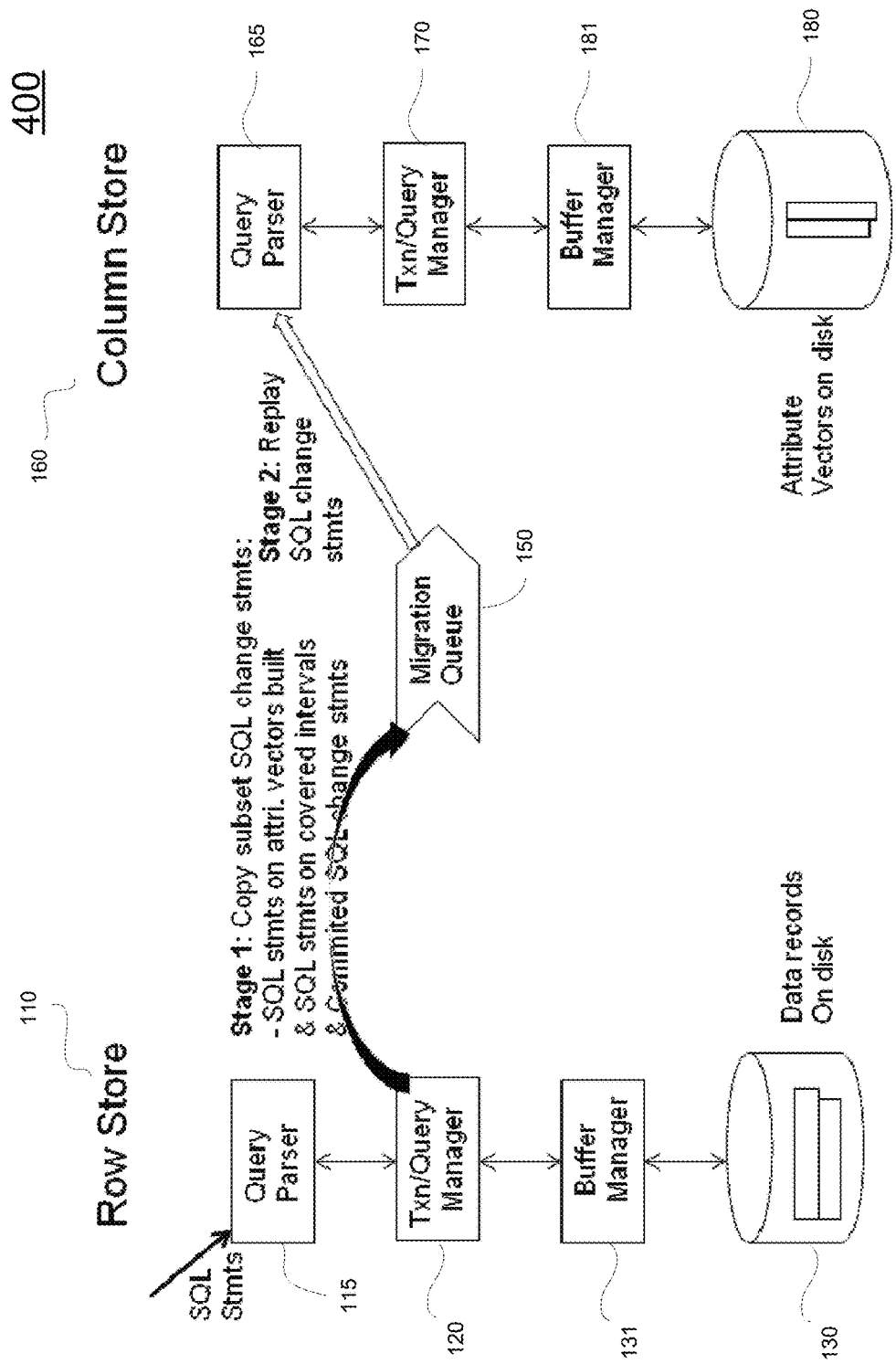
FIG. 4 is an data flow diagram illustrating the flow of information when accessing a column store database based on query demands, wherein the column store database is adaptively built to corresponding queries using a two stage statement based migration process, in accordance with one embodiment of the present disclosure.

As previously described, a two stage operation is implemented to migrate changes made to a row store database to a corresponding column store database at query run time. FIG. 4 is a data flow diagram 400 illustrating the flow of information when accessing a column store database based on query demands, wherein the column store database is adaptively built to corresponding queries using a two stage statement based migration process, in accordance with one embodiment of the present disclosure. Flow diagram 400 illustrates the generation of a column store database that is adaptively built to corresponding queries using a just-in-time and just-enough approach.

As shown in FIG. 4, a database system is built from functionally disparate FOSS database systems, and includes a row store database system 110 and a column store database system 160. In two stage data flow diagram 400, for change statements (e.g., SQL change statements) received on the open-source row store database system 110, selected change statements are stored and replayed on the open-source column store database system 160 to adaptively build the column store in response to analytic queries. This Statement-Based Migration (SBM) approach is implemented to build the column store database just-in-time to satisfy a corresponding analytic query, and with just-enough data so that the column store database is not over built.

In one embodiment the SBM process is based on migrating SQL change statements that are standardized by the American National Standards Institute (ANSI). These ANSI SQL change statements are supported across FOSS database systems. While each FOSS database system may have some SQL command extensions that are unique to its system, the majority of database systems can run core SQL DML change statements, such as select/insert/delete/update statements.

In addition, the SQL change statements present both the command and the data in ASCII format, that is universal across database systems. That is, instead of migrating logical representations of user change statements, SQL change statements in ASCII format are migrated so that there is no need for one database system to decode/uncompress the physical data of another database system.

Furthermore, in a statement based migration process, the column store database system 160 receives SQL change statements at its front-end component (e.g., query parser 165), and runs through its entire command operation. Using an independent FOSS column store database system significantly reduces development effort, because the FOSS column store database system is treated as a black box, for purposes of receiving SQL change statements used to import changes to the column store database.

Additionally, migrating SQL change statements avoids the difficult issue of translating compressed forms of the monotonically increasing sequence numbering of RowID of a table between database systems. That is, disparate database systems have incompatible RowIDs. Instead, by using SQL change statements in uncompressed form, the column store database system 160 is able to compress information (e.g., RowID) after receipt without any decompression and/or translation.

In one embodiment, an attribute vector of the column store database 180 is initially built when a column is referenced in a run time query and a table scan operation is first invoked to fetch table records. Different attribute vectors corresponding to different columns may be built at different times depending on when they are referenced in run time queries. An attribute vector can be enhanced later if an additional range is referenced in a subsequent query. In addition, as the primary key column can uniquely define a record, it has an association with RowID. As such, the primary key column is included when a new attribute vector is built, even if the primary key column is not referenced in the run time scan of the analytic query.

In particular, when executing the query, a scan operator is normally utilized to access data in the row store database. Embodiments of the present invention are able to piggy-back on top of the operations performed by the scan operator to build/enhance the attribute vector for each referenced column in the column store when a query is executed on a row store database. A scan operation performed by the scan operator can touch either all of records of a table by performing a full table scan, or a portion of records in a table by performing a partial table scan in embodiments of the present invention. As such, either a full table scan or a partial table scan may be performed (e.g., by a scan operator) to access the targeted amount of data imported to the column store database.

In a column store database, the table data are saved by columns, with one file or attribute vector file per column. As such, only one disk I/O is performed when accessing a column of data. When a new record with ten columns is added to a table, the system needs to modify ten files in a column store.

In one embodiment, batch processing of records is performed in order to speed up making the modification to the column store database. That is, a batch of records is added to the column store at one time. Ruther, the column store database system usually has a bulk load statement to load data in a batch. During the batch loading operation, the database logging mechanism is turned off in order to speed up the loading operation. When records are fetched from the row store database in a table scan operation, the output data is written in logical format to a file so that the column store system can use one or more bulk load statements to fetch records and then load those records into the column store database.

After the attribute vectors of a table have been built in the column store database 180, there can be changes made to the row store database 130 which need to be migrated to the column store database 180 in order to provide real time analytics. Statement based migration is performed in a two stage process as outlined in FIG. 4. The row store database 130 is the source of truth, since the column store database 180 is derived from the row store database 130.

In the first stage of the statement based migration process, a separate migration queue 150 is created to hold selected SQL change statements (e.g., insert/delete/update) that are later applied to the column store when executing a corresponding analytic query of a synchronization cycle. In one embodiment, to make the system sustain a system crash, the migration queue may be persisted to disk.

As previously described, in the first stage, not all of the SQL change statements are stored in the migration queue 150. Specifically, the query/transaction manager 120 is configured to manage the two stage statement based migration process for purposes of updating the column store database 180. In the first stage, the query/transaction manger 120 executes the change statements on the row store database 130. For instance, the buffer manager 131 manages the transfer of data to the row store data buffer of the row store database 130, for example. In addition, after the statement/transaction commit operation to the row store database 130, a subset of SQL change statements is stored and/or duplicated to the migration queue 150, wherein the migrated change statements meet the following three condition, as previously described, and briefly summarized, as follows: 1) those SQL change statements that impact attribute vectors already built; 2) those SQL change statements that impact any record in covered intervals of those attribute vectors already built; and 3) those SQL change statements that have been committed to the row store database. The uncommitted change statements (or later aborted changes) are skipped.

Changes for those columns that do not have corresponding attribute vectors or that are not made to entries in corresponding attribute vectors are not migrated to the migration queue 150. This is because, when a column is first referenced in the scan operation of a query, a corresponding attribute vector is built directly from the table records in the row store database 130. The table records will contain the most up-to-date content, and as such no migration of change information is necessary since it will be redundant.

In another case, even though an attribute vector for a column exists and is built, SQL change statements making changes to records in uncovered ranges/intervals are not migrated. Later, when a query references those column values in an uncovered interval, the attribute vector is enhanced by fetching column data directly from the table records in the row store database 130. For example, as previously described, a full table scan or partial table scan of the row store database is performed using a scan operator to either build or enhance the attribute vector for each referenced column in the column store database 180 of column store database system 160 when a query is executed on the row store database 130.

In the second stage of the statement based migration process, the SQL change statements stored in the migration queue 150 are replayed in the column store database system 160. Specifically, the query parser 165 of the column store database system 160 reads the SQL change statements from the migration queue 150, and the query/transaction manger 170 executes the SQL change statements to apply changes to the corresponding attribute vectors in the column store database 180. The buffer manager 181 manages the transfer of data to the column store data buffer of the column store database 180, for example. As a result, the column store database 180 is brought up-to-date. After updating in response to a received analytic query in a synchronization cycle, the column store database is in a position to process the analytic query.

As previously described, the SQL change statements stored in the migration queue 150 are associated with a synchronization cycle. That is, SQL change statements are migrated beginning after the previous synchronization point, which indicates the last point when the data in the column store database 180 and data in the row store database 130 are consistent. Though consistent, the data may not be entirely duplicated, as the data contained in the column store database 180 is stored in support of satisfying a previously received analytic query.

As previously described, the synchronization point is associated with the LSN of the last committed SQL change statement that is replayed in the column store database 180, and represents all the changes that have been migrated to the column store database 180. As such, after the second stage has replayed the SQL change statements in the migration queue 150 in the column store database 180, the synchronization point should be updated to reflect the LSN of the last committed SQL change statement in the cycle. At that point, the migration queue 150 may be flushed clean.

Additionally, the latest LSN is saved to metadata when an attribute vector is first built. Also, the latest LSN is saved to metadata when changes are made to the covered intervals of existing attribute vectors. For instance, the covered intervals may be expanded into previously uncovered intervals. By saving the latest LSN into metadata, it is clear to what point in time the column store database 180 has the latest data for the covered intervals of an attribute vector that is consistent with the row store database 130.

Figure 5A:
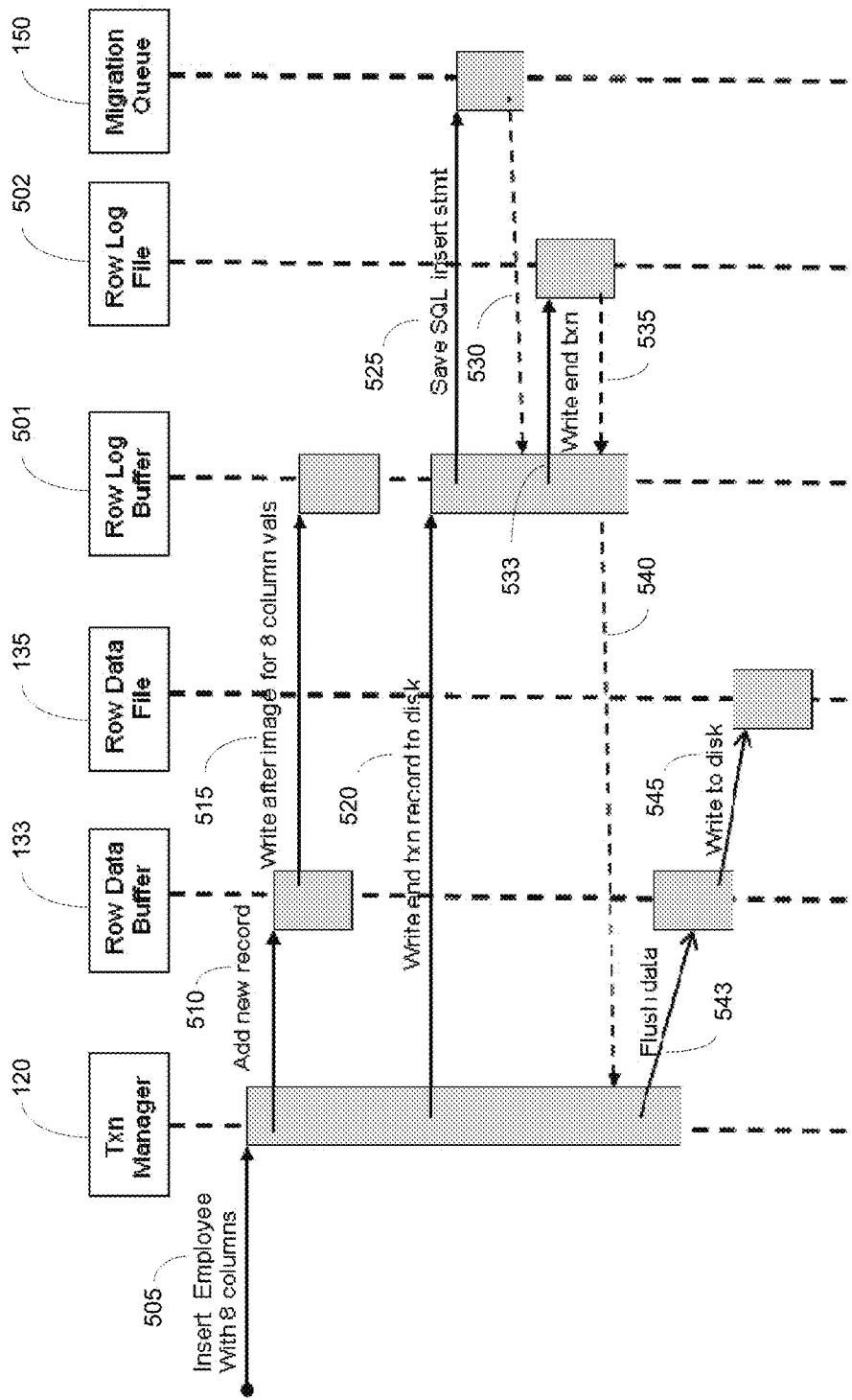
FIG. 5A is an illustration of a Unified Modeling Language (UML) sequence diagram of the first stage of a process implemented for dynamically and adaptively building a column store database, wherein the process uses an adaptive, just-in-time, and just-enough statement based migration process to satisfy an executing query, in accordance with one embodiment of the present disclosure.

FIG. 5A is an illustration of a Unified Modeling Language (UML) sequence diagram 500A of the first stage of the statement based migration process implemented for dynamically and adaptively building a column store database, wherein the process uses an adaptive, just-in-time, and just-enough statement based migration process to satisfy an executing query, in accordance with one embodiment of the present disclosure.

The previously introduced employee table is used to illustrate the migration process for the first and second stages shown in FIG. 5A. The employee table includes attributes for employee number (EmpNo); employee name (Name); gender (Gender); department number (DeptNo); start date (StartDate); title (Title); salary (Salary); and comment. In addition, in the example a corresponding column store database includes five attribute vectors for columns EmpNo, Name, DeptNo, StartDate, and Salary after the last received analytics query.

The following INSERT statement inserts a new record into Employee table of the row store database.

```
INSERT Employee VALUES (9051, 'John Smith', 'M', 201,
    '01/02/2014', 'Engineer', 90000.00, 'First employee in
    year 2014');
```

During the transaction commit for the row store database, the above listed insert statement is copied into the migration queue, as this insert statement will touch at least one of the five columns with attribute vectors already built.

FIG. 5A illustrates the interactions arranged in time sequence among the various components of a hybrid database system when executing the above listed insert statement. More specifically, at 505, the insert statement is received by the query/transaction manger 120 requesting the insertion of eight attribute values into the row store database (e.g., database 130). At 510, a new record is entered into the row store database, and more specifically, into the row data buffer 133 (e.g., non-persistent main memory) associated with the row store database. At 515, the after image is written for each of the eight attributes in the employee table into the row log buffer 501 (e.g., main memory) associated with the row store database. At 520, the end transaction is written to disk, and more specifically to the row log buffer 501 (e.g., main memory) associated with the row store database, as controlled by the query/transaction manager 120. At this time, the transaction has been committed to the row store database. In addition, up to this point, all operations are consistent with making changes to a row store database.

In the first stage of migration to the column store database, at 525, the insert statement listed above is copied to the migration queue 150. This is because the insert statement impacts at least one of the attribute vectors existing in the column store database. The insert SQL statement is copied to the migration queue 150 without any modifications, even though it normally contains input data for every column and only five columns or attribute vectors exist in the column store database.

As attribute vectors are built adaptively to received analytic queries, some columns do not have their corresponding attribute vectors built if they are never referenced in any of the previously received analytic queries. In one embodiment, the SQL change statements are not rewritten to match the existing attribute vectors in a column store database, as query rewrite takes significant development effort. Instead, a short circuit to the insert operation is invoked within the column store database system on columns without attribute vectors already built. In addition, the short circuit is also applied to an update operation if it impacts a column without a corresponding attribute vector. It should be noted that there is no change to the delete statement as it is equivalent to a no-op processing if a corresponding attribute does not exist.

At 530, a function call is returned to the row log buffer 501 and provides notification that the migration of the insert SQL change statement to the migration queue is complete.

In turn, returning back to making changes within a row store database system, at 533, the row log buffer 501 writes the end transaction to the row log file 502 associated with the row store database. The log file 502 can be persistent. At 535 and 540, function calls are returned to the row log buffer 501 and the query/transaction manger 120 so that the transaction manger 120 knows when the transaction bas been committed. Thereafter, at 543, an instruction is sent from the query/transaction manager 120 to the row data buffer 133 to flush the data. At 545, the data is flushed from the row data buffer 133 and written to the row data file 135. in one case, the row data file 135 is persistently stored to disk. At this point the change transaction for the row store database is complete.

Figure 5B:
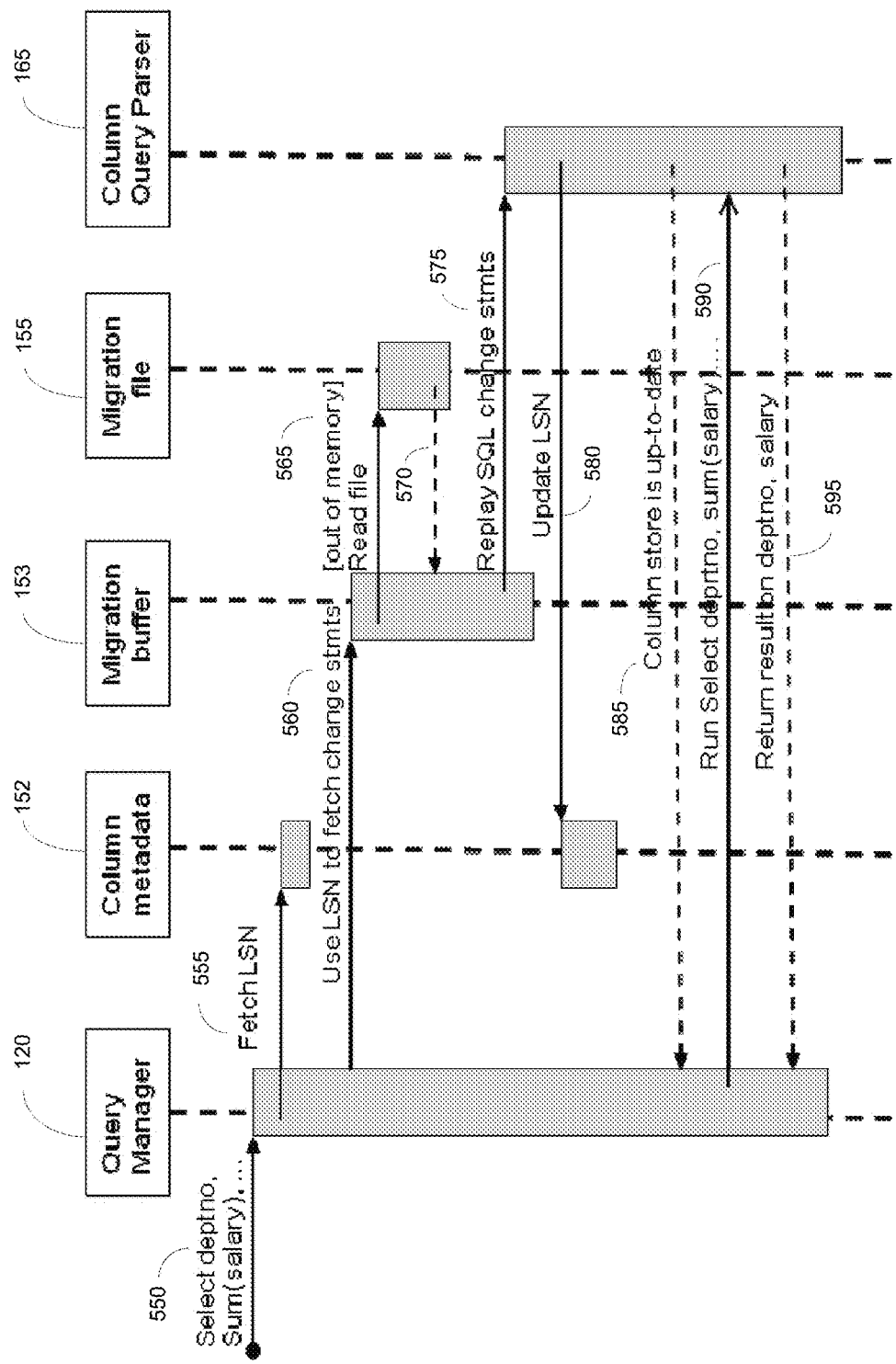
FIG. 5B is an illustration of a Unified Modeling Language (UML) sequence diagram of the second stage of a process implemented for dynamically and adaptively building a column store database, wherein the process uses an adaptive, just-in-time, and just-enough statement based migration process to satisfy an executing query, in accordance with one embodiment of the present disclosure.

When an analytic query runs, the second stage of the statement based migration process kicks in to apply the change statements to the corresponding attribute vectors. FIG. 5B is an illustration of a Unified Modeling Language (UML) sequence diagram 500B of the second stage of a process implemented for dynamically and adaptively building a column store database when a SELECT analytic query is executed, wherein the process uses an adaptive, just-in-time, and just-enough statement based migration process to satisfy an executing query, in accordance with one embodiment of the present disclosure.

Using the same example previously presented with the employee table and the insert statement, five attribute vectors have been built in the column store database for the following columns: columns EmpNo, Name, DeptNo, StartDate, and Salary after the last received analytics query. The previously introduced insert change statement was executed and inserted a new record into the employee table. As previously described, in the first stage, during a transaction commit operation in the row store database, the insert change statement was copied into the migration queue.

Continuing with the example provided above with reference to FIG. 5A, after the INSERT statement, an analytic query is received, as follows:

SELECT DeptNo, SUM(salary)FROM Employee GROUP BY DeptNo;

Right before the SELECT statement or analytic query is executed, the column store database system needs to run the SQL change statements stored in the migration queue. Suppose there is only one SQL insert statement in the migration queue for the example. Then, the column store database system will replay the SQL insert statement to add new field values to all five existing attribute vectors for the corresponding columns. This is accomplished even if the analytic query is requesting information from a subset of the five existing attribute vectors. After the attribute vectors are brought up-to-date, then the above SELECT statement is executed to fetch the data records from the column store database, and return the answer to the client.

As shown in FIG. 5B, the UML Sequence Diagram 500B shows the interactions arranged in time sequence among various components of a hybrid database system when executing the SELECT statement specified in the example, and more specifically during the second stage of the statement based migration process to update the column store database. UML Sequence Diagram 500B is a simplified diagram as only the metadata and the query parser components are shown from the column store database, while other components in the column store database are hidden. This is because the column store database system is treated as a black box, and the SQL statements are submitted to the front-end of the column store database at the query parser 165. After that, the column store database system takes full control and runs the SQL statements, such as the change statements and the analytic query. As such, the detailed operations running inside the column store database system are hidden.

At 550, the SELECT query is received by the query/transaction manager 120. At 555, the LSN corresponding to the last synchronization point is retrieved from the column metadata 162 that is associated with the column store database. At 560, the LSN for the synchronization point is used to determine which SQL change statements are fetched from the migration buffer 153. Specifically, the change statements are fetched from the migration buffer 153 beginning from the synchronization point (e.g., as indicated by the LSN) and continuing until all change statements in the synchronization cycle are exhausted. For instance, change statements are executed from the migration buffer 153 until the buffer is exhausted. In one implementation, the changes have higher LSNs than the LSN of the synchronization point.

At 565, if the change statements are not located in the migration buffer 153 (e.g., due to overflow), then the change statements are optionally fetched out of memory from the migration file 155 (e.g., persistent storage). In that case, at 570, the retrieved data is stored in the migration buffer 153 for fetching and processing by the query/transaction manger 120.

At 575, the SQL change statements stored in the migration buffer 153 are replayed in the column store database. In particular, the SQL change statements are submitted to the query parser 165 at the front-end of the column store database and are processed.

At 580, the LSN, or synchronization point, in the column metadata 162 is updated to the most recent LSN, such as, the LSN of the last committed transaction in the migration queue that was submitted to the column store database.

At 585, a function call is returned to the query/transaction manager 120 from the column store database system (e.g., the query parser 165), and provides notification that the column store database is up-to-date.

In addition, at 590, the query/transaction manger 120 provides an instruction to the query parser 165 at the front-end of the column store database system to run the SELECT analytic query previously presented in the example. At 595, the query parser 165 of the column store database system returns the result on the SELECT analytic query.

FIG. 6 is a diagram of an exemplary algorithm 600 implemented in the second stage, and is used for executing SQL statements saved in a migration buffer when building a column store database using an adaptive, just-in-time, and just-enough statement based migration process to satisfy an executing query, in accordance with one embodiment of the present disclosure. In particular, the algorithm 600 makes the assumption that the SQL change statements are saved into the migration queue, and is executed to replay the SQL change statements from the last synchronization point. In particular, the last committed LSN is located in the migration queue. From that point forward, SQL change statements are replayed in the column store database.

System Recovery

After a system crash, row store database is recovered first, as the row store database is defined as the source of truth. After the row store finishes the recovery operation, the column store database can be recovered based on the values in the row store database.

In particular, suppose $LSN_R$ is the latest log sequence number saved in the log file for the row store database. Also, the $LSN_C$ is the latest log sequence number saved in the log file for the column store database. As the migration queue is persisted to disk, there is no loss of SQL change statements after a system crash. Hence, there is nothing to recover in terms of data change migration. The second stage (e.g., algorithm of FIG. 6) of the two stage statement based migration process will kick in when a query scan operation is invoked. Since there is no data change in terms of migration, the entire system recovery operation of the hybrid row/column store databases will consume about the same amount of time for the system recovery of the row store.

Thus, according to embodiments of the present disclosure, systems and methods are described for using functionally disparate database systems to adaptively building a column store database from a row store database to satisfy an analytic query. Other embodiments of the present disclosure are described that are able to treat the column store database system as a block box most of the time, thereby significantly reducing the development effort in terms of both time and cost.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

Although the present invention and its advantages have been described in detail, it should be understood that various changes, substitutions, and alterations can be made herein without departing from the spirit and scope of the invention as defined by the appended claims. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Embodiments according to the present disclosure are thus described. While the present disclosure has been described in particular embodiments, it should be appreciated that the disclosure should not be construed as limited by such embodiments, but rather construed according to the below claims.

The invention claimed is:

1. A computer system for updating a database system, comprising:
a non-transitory memory storage comprising instructions; and
one or more processors in communication with said memory, wherein the one or more processors execute said instructions to:
establish a row store database, wherein each row of said row store database comprises a plurality of attributes;
establish a column store database comprising data structured to satisfy analytic queries that have been received, wherein said column store database comprises a plurality of attribute vectors corresponding to at least one attribute in said row store database, wherein each of said plurality of attribute vectors comprises data used to satisfy at least one of a plurality of previously received analytic queries;
collect a plurality of SQL change statements, that is a subset of a totality of change statements directed to the row store database, beginning from a synchronization point indicating when said row store database and said column store database are synchronized and continuing until an analytic query is received for migrating to the column store database to satisfy a corresponding analytic query, wherein the subset is extracted from the totality of change statements based on satisfying the following conditions: 1) one or more of the SQL change statements impact one or more of the plurality of attribute vectors constructed: 2) one or more of the SQL change statements impact one or more records in covered intervals of one or more of the plurality of attribute vectors constructed; and 3) one or more of the SQL change statements that have been committed to the row store database;
storing each of said plurality of SQL change statements in a migration queue after commitment;
replay the SQL change statements in the column store database such that the SQL change statements are read from the migration queue and executed to update the corresponding plurality of attribute vectors in the column store database after receipt and prior to execution of said analytic query;
sending the SQL change statements to the column store upon receipt of the analytic query in order to update the column store database for satisfying the query; and
fetch the data from the column store database, using a log sequence number (LSN) of one of the change statements of an add row store LSN associated with the synchronization point having been added to the column store metadata, after updating the corresponding plurality of attribute vectors, wherein said analytic query is directed to a queried range of primary key attributes in said plurality of attributes.

2. The computer system of claim 1, wherein said one or more processors further execute said instructions to: clear said migration queue after said plurality of SQL change statements are applied to said column store database.

3. The computer system of claim 1, wherein said one or more processors further execute said instructions to:
determine a first referenced attribute of a referenced attribute vector referenced by said analytic query, and returning a result based on said queried range of primary key attributes for said first referenced attribute vector to said query/transaction manager.

4. The computer system of claim 1, wherein said one or more processors further execute said instructions to:
determine if a covered range of primary key attributes in a first referenced attribute vector in said column store database and referenced by said analytic query is within said queried range of primary key attributes based on metadata; and
import data from said row store database to enhance said covered range in order to encompass said queried range;
wherein said metadata comprises information related to each attribute vector in said column store database and a covered range corresponding to each attribute vector in said column store database.

5. The computer system of claim 4, wherein one or more processors further execute said instructions to:
update said synchronization point to reflect a last committed SQL change statement in said plurality of SQL change statements.

6. The computer system of claim 1, wherein said one or more processors further execute said instructions to:
short circuit execution of an operation of a SQL change statement directed to a non-existent attribute vector in said column store database.

7. The computer system of claim 1, wherein said row store database and said column store database comprises open source database systems.

8. The computer system of claim 1, wherein
the collected plurality of SQL change statements is received for migrating to the column store database to satisfy a corresponding analytic query, and each of the SQL change statements is associated with a corresponding log sequence number used for synchronization.

9. A computer-implemented method for updating a column store database system using statement based migration, comprising:
establishing, with one or more processors, a row store database, wherein each row of said row store database comprises a plurality of attributes;
establishing, with the one or more processors, a column store database comprising data structured to satisfy analytic queries that have been received, wherein said column store database comprises a plurality of attribute vectors corresponding to at least one attribute in said row store database, wherein each of said plurality of attribute vectors comprises data used to satisfy at least one of a plurality of previously received analytic queries;

collecting, with the one or more processors, a plurality of SQL change statements beginning from a synchronization point indicating when said row store database and said column store database were last consistent with each other and continuing until an analytic query is received for migrating to the column store database to satisfy a corresponding analytic query, wherein the subset is extracted from the totality of change statements based on satisfying the following conditions: 1) one or more of the SQL change statements impact one or more of the plurality of attribute vectors constructed; 2) one or more of the SQL change statements impact one or more records in covered intervals of one or more of the plurality of attribute vectors constructed; and 3) one or more of the SQL change statements that have been committed to the row store database;

storing each of said plurality of SQL change statements in a migration queue after commitment;

replay the SQL change statements in the column store database such that the SQL change statements are read from the migration queue and executed to update the corresponding plurality of attribute vectors in the column store database after receipt and prior to execution of said analytic query;

sending the SQL change statements to the column store upon receipt of the analytic query in order to update the column store database for satisfying the query; and fetching the data from the column store database, using a log sequence number (LSN) of one of the change statements of an add row store LSN associated with the synchronization point having been added to the column store metadata, after updating the corresponding plurality of attribute vectors, wherein said analytic query is directed to a queried range of primary key attributes in said plurality of attributes.

10. The method of claim 9, further comprising:
clearing said migration queue after said plurality of SQL change statements are applied to said column store database.

11. The method of claim 9, further comprising:
determining a first referenced attribute of a referenced attribute vector referenced by said analytic query, and returning a result based on said queried range of primary key attributes for said first referenced attribute vector to a row store query/transaction manager for execution of said query.

12. The method of claim 9, further comprising:
determining if a covered range of primary key attributes in a first referenced attribute vector in said column store database and referenced by said analytic query is within said queried range of primary key attributes based on metadata; and
importing data from said row store database to enhance said covered range in order to encompass said queried range;
wherein said metadata comprises information related to each attribute vector in said column store database and a covered range corresponding to each attribute vector in said column store database.

13. The method of claim 9, further comprising:
updating said synchronization point to reflect a last committed SQL change statement in said plurality of SQL change statements after updating said column store database.

14. The method of claim 9, further comprising:
short circuiting execution of an operation of a SQL change statement directed to a non-existent attribute vector in said column store database.

15. A non-transitory computer-readable medium storing computer instructions for causing a computer system to perform a method for accessing information, that when executed by one or more processors, cause the one or more processors to perform the steps of:

establishing a row store database, wherein each row of said row store database comprises a plurality of attributes;

establishing a column store database comprising data structured to satisfy analytic queries that have been received, wherein said column store database comprises a plurality of attribute vectors corresponding to at least one attribute in said row store database, wherein each of said plurality of attribute vectors comprises data used to satisfy at least one of a plurality of previously received analytic queries;

collecting a plurality of SQL change statements beginning from a synchronization point indicating when said row store database and said column store database are synchronized and continuing until an analytic query is received for migrating to the column store database to satisfy a corresponding analytic query, wherein the subset is extracted from the totality of change statements based on satisfying the following conditions: 1) one or more of the SQL change statements impact one or more of the plurality of attribute vectors constructed; 2) one or more of the SQL change statements impact one or more records in covered intervals of one or more of the plurality of attribute vectors constructed; and 3) one or more of the SQL change statements that have been committed to the row store database;

storing each of said plurality of SQL change statements in a migration queue after commitment;

replay the SQL change statements in the column store database such that the SQL change statements are read from the migration queue and executed to update the corresponding plurality of attribute vectors in the column store database after receipt and prior to execution of said analytic query;

sending the SQL change statements to the column store upon receipt of the analytic query in order to update the column store database for satisfying the query; and fetching the data from the column store database, using a log sequence number (LSN) of one of the change statements of an add row store LSN associated with the synchronization point having been added to the column store metadata, after updating the corresponding plurality of attribute vectors, wherein said analytic query is directed to a queried range of primary key attributes in said plurality of attributes.

16. The computer-readable medium of claim 15, wherein the one or more processors further perform the steps of:
clearing said migration queue after said plurality of SQL change statements are applied to said column store database.

17. The computer-readable medium of claim 15, wherein the one or more processors further perform the steps of:
determining if a covered range of primary key attributes in a first referenced attribute vector in said column store database and referenced by said analytic query is within said queried range of primary key attributes based on metadata; and importing data from said row store database to enhance said covered range in order to encompass said queried range;

wherein said metadata comprises information related to each attribute vector in said column store database and a covered range corresponding to each attribute vector in said column store database.

18. The computer-readable medium of claim 15, wherein the one or more processors further perform the steps of:

determining a first referenced attribute of a referenced attribute vector referenced by said analytic query, and returning a result based on said queried range of primary key attributes for said first referenced attribute vector to a row store query/transaction manager for execution of said query.

19. The computer-readable medium of claim 15, wherein the one or more processors further perform the steps of:

updating said synchronization point to reflect a last committed SQL change statement in said plurality of SQL change statements after updating said column store database.

* * * * *